Patented Sept. 13, 1932

1,876,641

UNITED STATES PATENT OFFICE

AUGUST DORRER, WILHELM SCHEURER, AND ARTUR OHMER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYEING PREPARATION FOR COLORING CHROME LEATHER AND PROCESS OF MAKING THE SAME

No Drawing. Application filed April 18, 1930, Serial No. 445,520, and in Germany April 27, 1929.

The present invention relates to the production of dyestuffs particularly useful for coloring chrome leather, from nitroso compounds and aromatic amino and hydroxy compounds.

We have found that dyestuffs which are particularly suitable for coloring chrome leather, can be obtained by causing a N-nitroso compound to react with an aromatic compound which need not be a dyestuff itself, substituted by an amino-, or hydroxy-group, or by both these groups. Reaction takes place on warming the N-nitroso compounds with the said aromatic compounds even at a temperature between 60° and 70° C., that is to say at a temperature employed for dyeing chrome leather. Therefore, the new dyestuffs may be prepared separately and used for dyeing, or they may be produced in the dye bath by dyeing with a mixture of the said components. Particularly suitable nitroso compounds are those obtained by the action of nitrous acid on compounds or azo dyestuffs containing a diphenylamine radicle. On chrome leather, the new dyestuffs furnish dyeings which for the most part differ very considerably in shade from those of the initial material. For example, the action of the nitroso compound of the azo dyestuff from sulphanilic acid and diphenylamine (which dyes chrome leather yellow) on the azo dyestuff from sulphanilic acid and α-naphthol (which dyes chrome leather orange), furnishes a product which gives deep red brown dyeings on chrome leather. The components may be brought into action in molecular proportions, or also in other relative proportions up to about 5 times the amount of one component over the other. Similar effects to those on chrome leather may also be obtained on other fibres such as sumac-tanned sheepskin, wool or cotton.

The preparation of the nitroso compounds of azo dyestuffs may be carried out as described by Juillard in "Bulletin de la Société Chimique de Paris," 3rd series vol. 33 page 984.

The following examples will further illustrate the nature of this invention but the invention is not restricted to these examples. The parts are by weight.

Example 1

50 parts of the azo dyestuff from sulphanilic acid and α-naphthol having the formula:

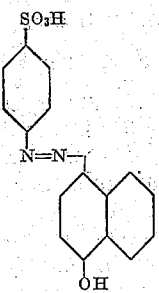

are heated at about 90° centigrade for several hours with 50 parts of the nitroso compound of the azo dyestuff from sulphanilic acid and diphenylamine having the formula:

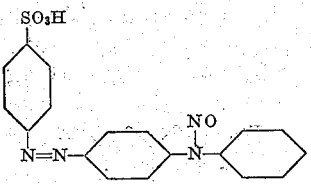

in 500 parts of water. The dyestuff salted out with common salt, gives very uniform dark red brown dyeings on chrome leather, similar dyeings being also obtained on sumac-tanned sheepskin and on wool.

Example 2

60 parts of the azo dyestuff from 4-nitraniline-2-sulphonic acid and α-naphthol are mixed with 40 parts of the nitroso compound of the azo dyestuff from sulphonated naphthylamine (containing 2.5- and 2.8- naphthylamine sulphonic acid) and diphenylamine. The mixture gives fawn dyeings on chrome leather.

Example 3

60 parts of the dyestuff, 4-aminoazobenzene-3.4'-disulphonic acid azo-α-naphthol having the formula:

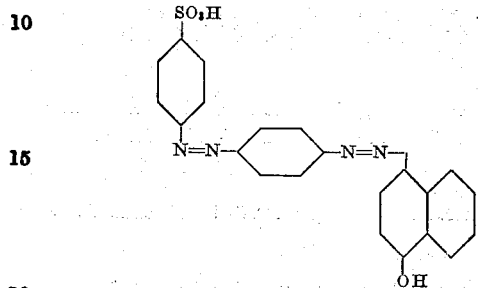

are mixed with 40 parts of the nitroso compound of the dyestuff from sulphanilic acid and diphenyl amine. The resulting mixture gives deep Bordeaux dyeings on chrome leather.

Example 4

40 parts of the azo dyestuff from sulphanilic acid and α-naphthylamine are mixed with 60 parts of the nitroso compound of the azo dyestuff from 4-chloroaniline-3-sulphonic acid and diphenylamine. The mixture dyes chrome leather dark brown.

Example 5

50 parts of the azo dyestuff from sulphanilic acid and resorcinol together with 50 parts of N-nitrosodiphenylamine-sulphonic acid obtainable as described in the paper in the Bulletin de la Société Chimique de Paris above referred to with respect to the nitroso compounds of azo dyestuffs, are employed for dyeing chrome leather, olive brown shades being obtained.

Example 6

50 parts of the nitroso compound of the azo dyestuff from sulphanilic acid and diphenylamine are boiled with 50 parts of 2.5-aminonaphthol-7-sulphonic acid having the formula:

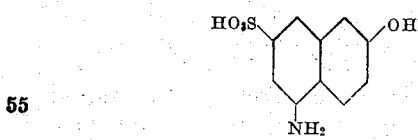

in 500 parts of water for 2 hours. The dyestuff salted out with common salt gives very uniform grey dyeings on chrome leather, similar dyeings being obtained on sumac-tanned sheepskin and on wool.

Example 7

The mixture specified in Example 6 is warmed at 60° C. with 3 parts of sodium carbonate, for several hours. The dyestuff salted out with common salt gives brown dyeings on chrome leather.

Example 8

80 parts of the nitroso compound of the azo dyestuff from sulphonated naphthylamine (containing 2.5- and 2.8-naphthylamine sulphonic acid) and diphenylamine, are boiled for a short time with 20 parts of 4-amino-1-toluene-2-sulphonic acid in 300 parts of water. The dyestuff salted out with common salt gives yellow-brown dyeings on chrome leather.

Example 9

A mixture of 50 parts of the nitroso compound of the azo dyestuff from sulphanilic acid and diphenylamine, and 50 parts of β-naphthylamine hydrochloride, is employed for dyeing chrome leather, a clear orange shade being obtained.

Example 10

A mixture of 50 parts of the nitroso compound of the azo dyestuff from sulphanilic acid and diphenylamine and 20 parts of α-naphthylamine hydrochloride dyes chrome leather dark brown.

Example 11

40 parts of the nitroso compound of the azo dyestuff from 4-chloroaniline-3-sulphonic acid and diphenylamine, having the formula:

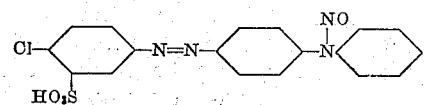

are mixed with 60 parts of 1-amino-8-hydroxynaphthalene-4-sulphonic acid. The mixture gives brownish-grey dyeings on chrome leather.

Example 12

By dyeing chrome leather with a mixture of equal parts of the nitroso compound of the dyestuff, sulphanilic acid-azo-diphenylamine, and 2-amino-3-hydroxynaphthalene-6-sulphonic acid, dark brown dyeings are obtained.

Example 13

80 parts of the N-nitrosodiphenylamine-sulphonic acid employed in Example 5 are boiled with 20 parts of 4-amino-1-toluene-2-sulphonic acid in faintly acid solution. The solution dyes chrome leather grey with greenish tinge.

Example 14

20 parts of the N-nitrosodiphenylamine-sulphonic acid employed in Example 5 are mixed with 80 parts of 2-amino-8-hydroxynaphthalene-6-sulphonic acid. The resulting mixture dyes chrome leather wine red shades.

Example 15

40 parts of 2-methylnitrosoaminobenzene-1-carboxylic acid obtainable as described in "Berichte der Deutschen Chemischen Gesellschaft" vol. 34, page 1644 together with 60 parts of 2-amino-5-hydroxynaphthalene-7-sulphonic acid are employed for dyeing chrome leather, light brown dyeings being obtained.

What we claim is:—

1. A process of producing new dyestuffs, which comprises warming a N-nitroso compound of a monoazo dyestuff selected from the group consisting of the benzene and naphthalene series with an aromatic compound selected from the group consisting of the benzene and naphthalene series substituted by at least one radicle selected from the group consisting of amino and hydroxy radicles.

2. A process of producing new dyestuffs, which comprises warming a N-nitroso compound of a monoazo dyestuff selected from the group consisting of the benzene and naphthalene series containing a diphenylamine radicle with an aromatic compound selected from the group consisting of the benzene and naphthalene series substituted by at least one radicle selected from the group consisting of amino and hydroxy radicles.

3. A process of producing new dyestuffs, which comprises warming a N-nitroso compound of a monoazo dyestuff selected from the group consisting of the benzene and naphthalene series with a monoazo dyestuff selected from the group consisting of the benzene and naphthalene series substituted by at least one radicle selected from the group consisting of amino and hydroxy radicles.

4. As new articles of manufacture dyeing preparations comprising a N-nitroso compound of a monoazo dyestuff selected from the group consisting of the benzene and naphthalene series, and an aromatic compound selected from the group consisting of the benzene and naphthalene series substituted by at least one radicle selected from the group consisting of amino and hydroxy radicles.

5. As new articles of manufacture dyeing preparations comprising a N-nitroso compound of a monoazo dyestuff selected from the group consisting of the benzene and naphthalene series containing a diphenylamine radicle, and an aromatic compound selected from the group consisting of the benzene and naphthalene series substituted by at least one radicle selected from the group consisting of amino and hydroxy radicles.

6. As new articles of manufacture dyeing preparations comprising a N-nitroso compound of a monoazo dyestuff selected from the group consisting of the benzene and naphthalene series containing a diphenylamine radicle, and a monoazo dyestuff selected from the group consisting of the benzene and naphthalene series substituted by at least one radicle selected from the group consisting of amino and hydroxy radicles.

In testimony whereof we have hereunto set our hands.

AUGUST DORRER.
WILHELM SCHEURER.
ARTUR OHMER.